(12) United States Patent
Medles

(10) Patent No.: US 11,647,460 B2
(45) Date of Patent: May 9, 2023

(54) METHOD AND APPARATUS FOR INDICATING POWER SAVING INFORMATION IN MOBILE COMMUNICATIONS

(71) Applicant: MediaTek Singapore Pte. Ltd., Singapore (SG)

(72) Inventor: Abdelkader Medles, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 0 days.

(21) Appl. No.: 16/724,373

(22) Filed: Dec. 22, 2019

(65) Prior Publication Data

US 2020/0213943 A1 Jul. 2, 2020

Related U.S. Application Data

(60) Provisional application No. 62/784,868, filed on Dec. 26, 2018.

(51) Int. Cl.
*H04W 52/02* (2009.01)

(52) U.S. Cl.
CPC ... *H04W 52/0216* (2013.01); *H04W 52/0229* (2013.01); *H04W 52/0235* (2013.01)

(58) Field of Classification Search
CPC ......... H04W 52/0216; H04W 52/0229; H04W 52/0235
See application file for complete search history.

(56) References Cited

U.S. PATENT DOCUMENTS

| | | | | |
|---|---|---|---|---|
| 8,289,891 | B2* | 10/2012 | Ji | H04W 52/0232 370/311 |
| 8,923,178 | B2* | 12/2014 | Anderson | H04W 52/0219 370/311 |
| 9,332,584 | B2 | 5/2016 | Verger et al. | |
| 11,102,755 | B2* | 8/2021 | Wong | H04W 76/28 |
| 2009/0279466 | A1* | 11/2009 | Ji | H04W 52/0232 370/311 |
| 2012/0106423 | A1* | 5/2012 | Nylander | H04M 15/7657 370/311 |

(Continued)

FOREIGN PATENT DOCUMENTS

| | | |
|---|---|---|
| CN | 101472272 A | 7/2009 |
| CN | 107431982 A | 12/2017 |

OTHER PUBLICATIONS

China National Intellectual Property Administration, International Search Report and Written Opinion for PCT/CN2019/128630, dated Mar. 27, 2020.

(Continued)

*Primary Examiner* — Phuc H Tran
(74) *Attorney, Agent, or Firm* — Han IP PLLC; Andy M. Han

(57) ABSTRACT

Various solutions for indicating power saving information with respect to user equipment and network apparatus in mobile communications are described. An apparatus may enter into a power saving mode. The apparatus may monitor a downlink control information (DCI) format while in the power saving mode. The apparatus may determine whether the DCI format is detected. The apparatus may wake up from the power saving mode in an event that the DCI format is not detected.

12 Claims, 5 Drawing Sheets

(56) References Cited

U.S. PATENT DOCUMENTS

| | | | | |
|---|---|---|---|---|
| 2012/0275364 | A1* | 11/2012 | Anderson | H04W 52/0222 370/311 |
| 2015/0023238 | A1* | 1/2015 | Fukuta | H04W 72/042 370/311 |
| 2015/0237582 | A1 | 8/2015 | Ishii | |
| 2015/0359034 | A1* | 12/2015 | Kim | H04W 76/28 370/328 |
| 2016/0198408 | A1* | 7/2016 | Jhang | H04L 1/1848 370/311 |
| 2017/0048842 | A1* | 2/2017 | Han | H04W 52/0216 |
| 2017/0202055 | A1* | 7/2017 | Feuersaenger | H04L 5/0053 |
| 2017/0272999 | A1* | 9/2017 | Tsai | H04W 52/0274 |
| 2017/0339641 | A1* | 11/2017 | Nigam | H04L 5/0096 |
| 2018/0279274 | A1* | 9/2018 | Sun | H04L 1/1864 |
| 2018/0332533 | A1 | 11/2018 | Bhattad et al. | |
| 2019/0090299 | A1* | 3/2019 | Ang | H04L 5/003 |
| 2019/0239192 | A1* | 8/2019 | Tang | H04B 7/0695 |
| 2020/0037242 | A1* | 1/2020 | Yilmaz | H04W 52/0216 |
| 2020/0037389 | A1* | 1/2020 | Feuersaenger | H04L 27/2602 |
| 2020/0037396 | A1* | 1/2020 | Islam | H04W 76/27 |
| 2020/0077338 | A1* | 3/2020 | Sui | H04W 52/0229 |
| 2020/0169982 | A1* | 5/2020 | Hoglund | H04W 52/0219 |
| 2020/0205075 | A1* | 6/2020 | Nam | H04W 52/0235 |
| 2020/0214078 | A1* | 7/2020 | Jiang | H04W 52/0216 |
| 2020/0367166 | A1* | 11/2020 | Wong | H04W 56/005 |
| 2020/0389847 | A1* | 12/2020 | Deng | H04B 7/0617 |
| 2020/0403763 | A1* | 12/2020 | Takeda | H04W 72/0453 |
| 2021/0185613 | A1* | 6/2021 | Kalhan | H04W 68/005 |
| 2021/0195521 | A1* | 6/2021 | Muller | H04W 76/28 |

OTHER PUBLICATIONS

ZTE, Power consumptino reduction for physical channels for NB-IoT, R1-1713015, 3GPP TSG RAN WG1 Meeting #90, Prague, Czech Republic, Aug. 21-25, 2017.

Interdigital, Inc., On UE adaptation for power saving, R1-1811226, 3GPP TSG RAN WG1 Meeting #94bis, Chengdu, China, Oct. 8-12, 2018.

Huawei et al., Design of power saving signal, R1-1812232, 3GPP TSG RAN WG1 Meeting #95, Spokane, USA, Nov. 12-16, 2018.

Oppo, Impacts of PDCCH-based wake up signalling, R2-1905603, 3GPP TSG-RAN WG2 Meeting #106, Reno, USA, May 13-17, 2019.

Taiwan Intellectual Property Office, Office Action for Taiwan Patent Application No. 108147311, dated Jun. 23, 2021.

ZTE, Power consumption reduction for physical channels for NB-IoT, R1-1717207, 3GPP TSG RAN WG1 Meeting #90bis, Prague, Czech Republic, Oct. 9-13, 2017.

China National Intellectual Property Administration, First Office Action for China Patent Application No. 201980005405.5, dated Feb. 27, 2023.

China National Intellectual Property Administration, Search Report for China Patent Application No. 201980005405.5, dated Feb. 27, 2023.

Ericsson, "Triggers of NR UE power saving", 3GPP TSG-RAN WG1 Meeting #95, R1-1813183, Spokane, USA, Nov. 12-16, 2018.

* cited by examiner

METHOD AND APPARATUS FOR INDICATING POWER SAVING INFORMATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/784,868, filed on 26 Dec. 2018, the content of which is incorporated by reference in its entirety.

TECHNICAL FIELD

The present disclosure is generally related to mobile communications and, more particularly, to indicating power saving information with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), for a user equipment (UE) in the connected mode, data exchange with the network is expected to be sporadic. The UE will spend most of its time only for monitoring physical downlink control channel (PDCCH). Even for data intensive activities such as video streaming, with improvements in data rates in NR, it is expected that the video data is buffered fairly quickly, and the UE drops into a state of data inactivity during which only PDCCH monitoring takes place. Such state will cause unnecessary power consumption and is not beneficial for UE power management.

A wake-up indication (WUI) mechanism is proposed as an enhancement to the discontinuous reception (DRX) mechanism for power saving at UE side. The WUI may be used to indicate to a UE to expect activity. The UE may be configured to monitor the WUI on predetermined occasions. Upon receiving a WUI, the UE may wake up to monitor a configured search space for DL/UL scheduling. Without receiving a WUI, the UE may keep staying in the power saving mode.

However, the WUI mechanism requires very accurate signalling. This may not be always accomplished in radio link communication. The WUI mechanism could suffer for lack of reliability. For example, when beamforming technology is used, the network node may not know the beams that the UE can decode for receiving the WUI. Alternatively, the beams that were activated/configured or being monitored by the UE may also be blocked by obstacles. In those conditions, the network node may not be able to transmit the wake-up signal/indication to the UE which will then carry on sleeping. Thus, the latency, throughput and link reliability performance will be impacted or descended. A UE that loses the link is expected to start a procedure of beam/link recovery and/or potential handover to a more reliable cell. This may cause extra waiting time and power consumption. Therefore, the power saving information (e.g., WUI) in these cases must tolerate possibility that the link may become less reliable since the transmission/reception of the WUI may be missed or failed.

Accordingly, how to indicate power saving information in a reliable scheme for a UE in the power saving mode or sleep mode becomes an important issue for the newly developed wireless communication network. Therefore, it is needed to provide proper mechanisms to indicate and interpret power saving information between the UE and the network node.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to indicating power saving information with respect to user equipment and network apparatus in mobile communications.

In one aspect, a method may involve an apparatus entering into a power saving mode. The method may also involve the apparatus monitoring a DCI format while in the power saving mode. The method may further involve the apparatus determining whether the DCI format is detected. The method may further involve the apparatus waking up from the power saving mode in an event that the DCI format is not detected.

In one aspect, a method may involve an apparatus entering into a power saving mode. The method may also involve the apparatus monitoring a DCI format while in the power saving mode. The method may further involve the apparatus determining whether the DCI format is detected. The method may further involve the apparatus determining not to wake up from the power saving mode in an event that the DCI format is detected.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising entering into a power saving mode. The processor may also perform operations comprising monitoring, via the transceiver, a DCI format while in the power saving mode. The processor may further perform operations comprising determining whether the DCI format is detected. The processor may further perform operations comprising waking up from the power saving mode in an event that the DCI format is not detected.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising entering into a power saving mode. The processor may also perform operations comprising monitoring, via the transceiver, a DCI format while in the power saving mode. The processor may further perform operations comprising determining whether the DCI format is detected. The processor may further perform operations comprising determining not to wake up from the power saving mode in an event that the DCI format is detected.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
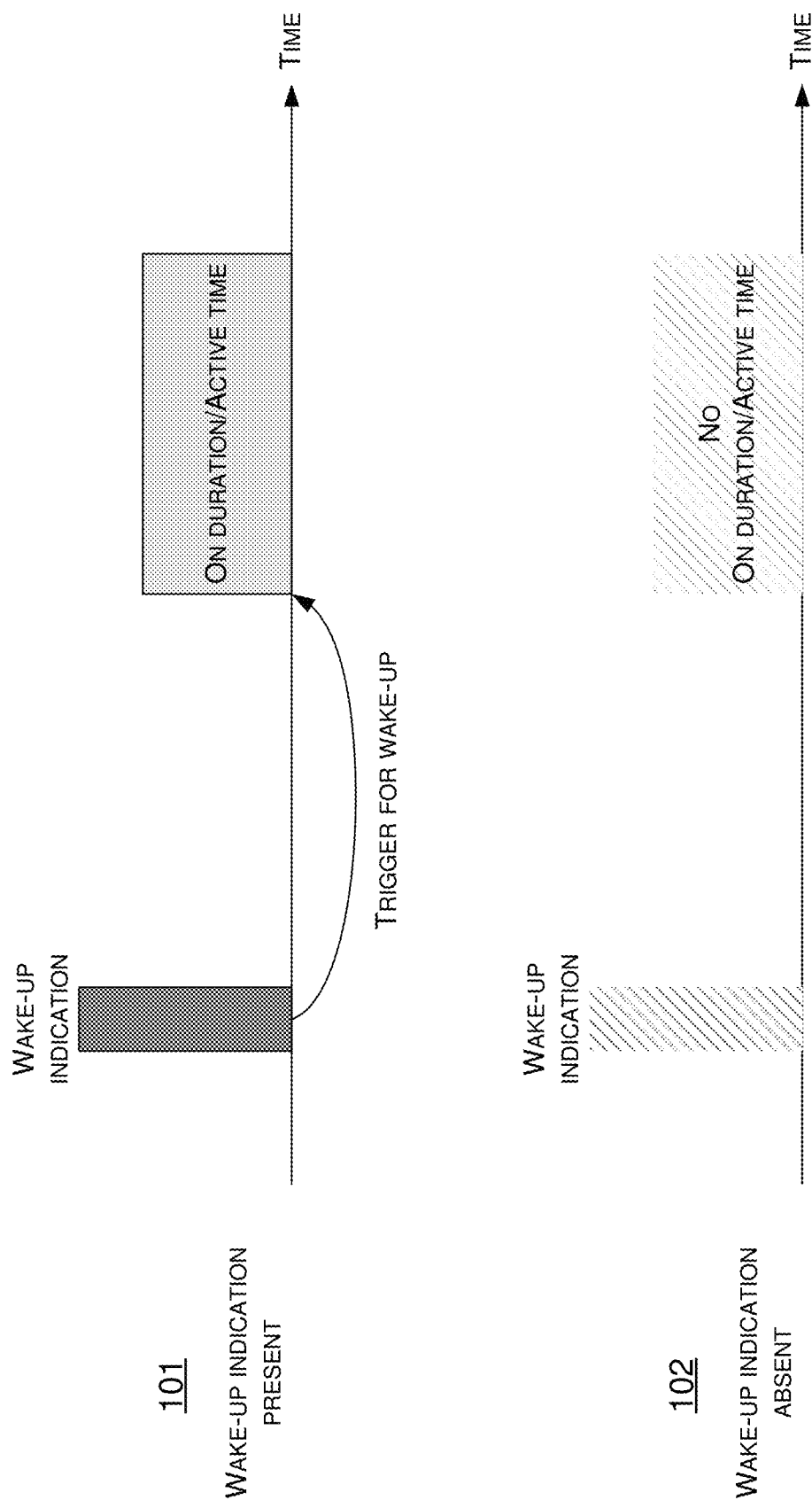
FIG. 1 is a diagram depicting example scenarios under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to indicating power saving information with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, for a UE in the connected mode, data exchange with the network is expected to be sporadic. The UE will spend most of its time only for monitoring the PDCCH. Even for data intensive activities such as video streaming, with improvements in data rates in NR, it is expected that the video data is buffered fairly quickly, and the UE drops into a state of data inactivity during which only PDCCH monitoring takes place. Such state will cause unnecessary power consumption and is not beneficial for UE power management.

The DRX mechanism in NR that is inherited from LTE, requires the UE to intermittently monitor PDCCH, allowing the UE to transit to a sleep mode in the interval. The DRX on duration defines a period of time every DRX cycle that the UE monitors for potential activity. On the occurrence of activity during the on duration (e.g., the reception of a DCI scheduling uplink (UL) and/or downlink (DL) activities), the DRX inactivity timer is triggered. The DRX inactivity timer restarts each time data is exchanged between the UE and the network, keeping the UE awake while data exchange takes place. On the expiry of the inactivity timer, the UE goes back to sleep. The UE will monitor for activity again in next on duration.

However, the level of power savings that can be achieved with DRX is down to the network configuration. The percentage of time in a DRX cycle that a UE needs to stay awake for, directly corresponds to the power savings possible. The monitoring window of the DRX mechanism (e.g., DRX on duration) can be quite long (e.g., 10 ms) which causes the UE to burn power for downlink monitoring. The UE power consumption is unable to be properly controlled if the network configuration is not well designed.

Accordingly, a WUI mechanism is further proposed as an enhancement to the DRX framework for power saving at UE side. The WUI may be used to indicate to a UE to expect activity. The UE may be configured to monitor the WUI on predetermined occasions. Upon receiving a WUI, the UE may wake up (e.g., exit from the power saving mode) to monitor a configured search space for DL/UL scheduling. Without receiving a WUI, the UE may keep staying in the power saving mode.

FIG. 1 illustrates example scenarios 101 and 102 under schemes in accordance with implementations of the present disclosure. Scenarios 101 and 102 involve a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenarios 101 and 102 illustrate the wake-up mechanism proposed in the present disclosure. The UE may be configured to enter into a power saving mode. As shown in scenario 101, the network node may transmit the WUI to wake up the UE from the power saving mode for possible DL/UL transmissions or link maintenance activities. The WUI may trigger the UE to wake up for an on duration or active time. In an event that the WUI is not present, as shown in scenario 102, the UE may be configured to stay in the power saving mode and not to wake up since no data exchange is expected.

However, the WUI mechanism requires very accurate signalling. This may not be always accomplished in radio link communication. The WUI mechanism could suffer for lack of reliability. For example, when beamforming technology is used, the network node may not know the beams that the UE can decode for receiving the WUI. Alternatively, the beams that were activated/configured or being monitored by the UE may also be blocked by obstacles. In those conditions, the network node may not be able to transmit the wake-up signal/indication to the UE which will then carry on sleeping. Thus, the latency, throughput and link reliability performance will be impacted or descended. A UE that loses the link is expected to start a procedure of beam/link recovery and/or potential handover to a more reliable cell. This may cause extra waiting time and power consumption. Therefore, the power saving information (e.g., WUI) in these cases must tolerate possibility that the link may become less reliable since the transmission/reception of the WUI may be missed or failed.

In view of the above, the present disclosure proposes a number of schemes pertaining to indicating power saving information with respect to the UE and the network apparatus. According to the schemes of the present disclosure, instead of signalling to the UE when to wake-up, it is better to signal to the UE when not to wake-up or not to monitor the PDCCH. The network node may transmit a WUI indicating not to wake or a wake-up cancellation (WUC) indication to the UE. Upon receiving such indication, the UE may stay in the power saving mode undoubtedly. In absence of such indication or other indications, the UE still wake up to monitor possible DL/UL activities for preventing loss of power saving information due to unreliable radio links. By such design, even if the power saving information is missed or failed, the UE still can wake up to check if there is any DL/UL activities scheduled by the network node. Thus, no transmissions will be missed due to the radio link condition. Accordingly, the latency, throughput and link reliability performance will not be impacted/descended when the link becomes less reliable. The power saving indication according to the schemes of the present disclosure can tolerate unreliability of the links.

Figure 2:
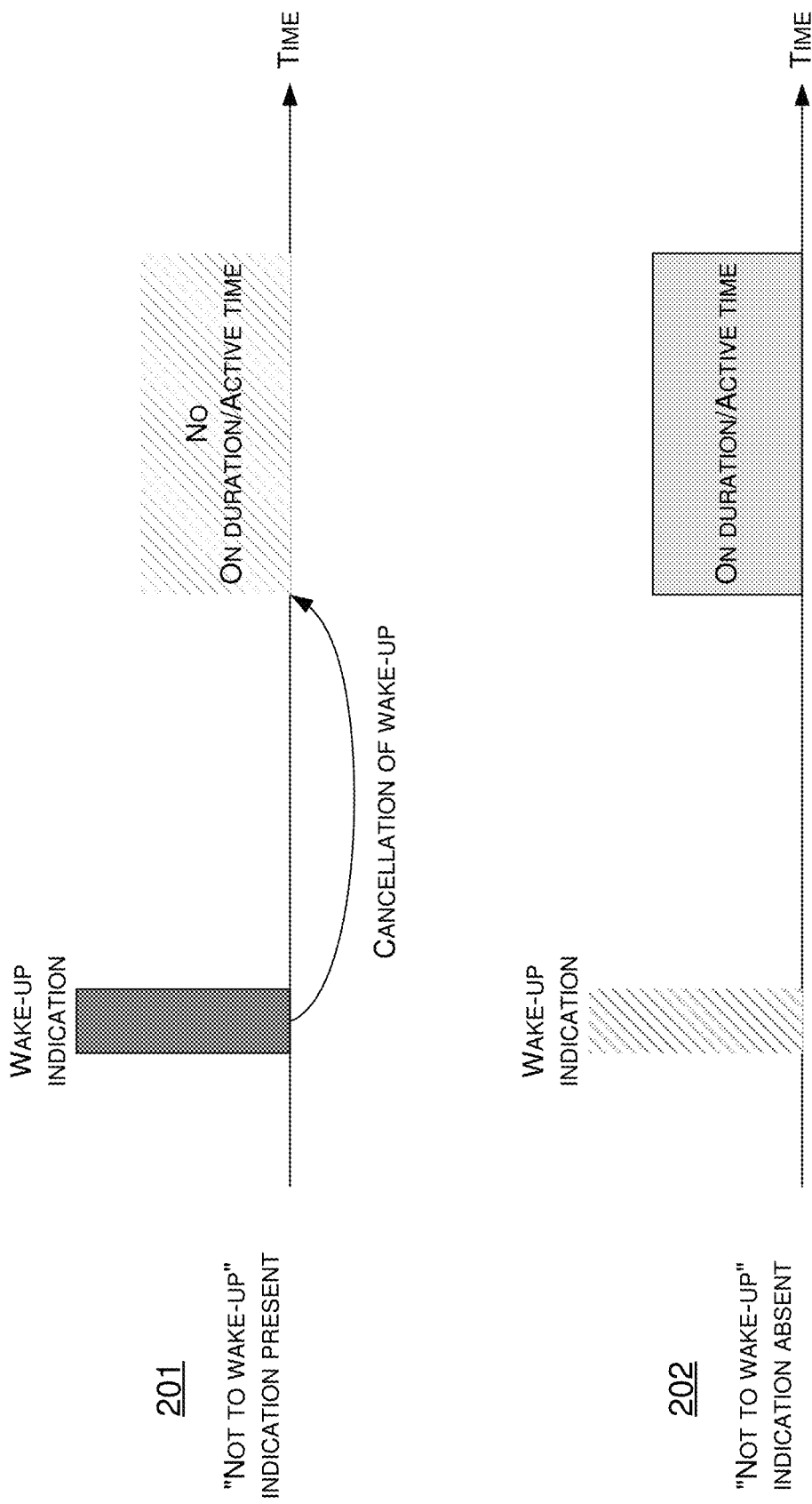
FIG. 2 is a diagram depicting example scenarios under schemes in accordance with implementations of the present disclosure.

FIG. 2 illustrates example scenarios 201 and 202 under schemes in accordance with implementations of the present disclosure. Scenarios 201 and 202 involve a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). Scenarios 201 and 202 illustrate the indication mechanism of power saving information proposed in the present disclosure. In scenarios 201, when the power saving information is present, the UE may be configured to cancel the wake-up for the on duration or active time. Specifically, the UE may be configured to enter into a power saving mode. The UE may monitor a downlink control information (DCI) format while in the power saving mode. The UE may determine whether the DCI format is detected/received. In an event that the DCI format is detected/received, the UE may determine not to wake up from the power saving mode. After receiving the DCI format, the UE may keep staying in the power saving mode.

The DCI format (e.g., DCI format 2_6) may be used for notifying the power saving information to the UE. The power saving information may comprise a WUI. The WUI may comprise one bit for indicating the UE to wake up or not to wake up. In scenarios 201, the WUI may indicate the UE not to wake up. Alternatively, the DCI format may comprise a WUC indication. The WUC indication may be used to indicate the UE to cancel the wake-up for the on duration or active time. Accordingly, upon receiving the WUI indicating not to wake or the WUC indication, the UE may know that there is no data exchange expected and may stay in the power saving mode. The UE may be configured to cancel the monitoring of the PDCCH in an event that the DCI format is detected/received.

In scenarios 202, when the power saving information is not present, the UE may be configured to wake up for the on duration or active time. Specifically, the UE may be configured to enter into a power saving mode. The UE may monitor a DCI format while in the power saving mode. The UE may determine whether the DCI format is detected/received. In an event that the DCI format is not detected/received, the UE may determine to wake up from the power saving mode. The UE may be configured to monitor the PDCCH after waking up from the power saving mode.

The DCI format (e.g., DCI format 2_6) may comprise the power saving information. The power saving information may comprise a WUI. The WUI may comprise one bit for indicating the UE to wake up or not to wake up. In absent of the DCI format or the power saving information, the UE may be not sure whether the DCI format is missed. Without an explicit indication indicating not to wake up, the UE may be configured to still wake up for monitoring any possible DL/UL activities. Thus, in an event that a WUI is missed, the UE still have chance to receive the scheduled DL/UL transmissions. The latency, throughput, link reliability and system performance can still be maintained.

In some implementations, in an event that the DCI format is not detected, the UE may be configured to determine whether to wake up according to a higher layer signaling (e.g., radio resource control (RRC) signaling). The higher layer signaling may configure a parameter for indicating whether UE wakes up or UE does not wake up. The UE may determine whether to wake up in an event that the DCI format is not detected according to the parameter in the higher layer signaling. For example, in an event that the parameter is configured as "not wake up", the UE may be configured not to wake up when the DCI format is not detected. In an event that the parameter is configured as "wake up", the UE may be configured to wake up when the DCI format is not detected.

In some implementations, the WUC indication/signal may be used to indicate the UE not to wake up in an on duration (e.g., DRX-OnDuration) or cancel an on duration (e.g., DRX-OnDuration). Alternative, the WUC indication/signal may implemented as "Not monitor PDCCH in Drx-OnDuration" or cancel the DRX-OnDuration. The UE may be configured to cancel the monitoring of the PDCCH after receiving the WUC indication/signal. The WUC indication/signal may be carried in DCI or part of larger signalling message.

In some implementations, the power saving information/DCI format may be transmitted by a different beam from the beam used by the UE to monitor the other PDCCH/DCI messages. For example, the power saving information/DCI format may be transmitted on an omni-directional beam. The power saving information may be carried in a group common DCI shared among a group of UEs. Each UE in this case will have a dedicated number of bits used for the power saving information. The power saving information/DCI format may be transmitted in a beam-sweeping mechanism. The power saving information/DCI format may be transmitted over several beams to improve reliability.

In some implementations, the power saving information (e.g., wake-up signal (WUS), WUI or WUC) may have limitations due to beam-failure. In an event that the UE detects that the power saving information is not reliable enough, the UE may determine to ignore the outcome of the power saving information decoding and wake up normally to monitor the PDCCH. Alternatively, in an event that the UE hasn't received the power saving information, the UE may still wake-up to monitor the PDCCH. Alternatively, the UE may also wake up to send a signal to inform the network node that the power saving information is not reliable.

In some implementations, the UE may be configured to determine the reliability of the power saving information.

The UE may determine the reliability according to the quality of the demodulation reference signal (DMRS) used for decoding the power saving information. For example, the UE may determine the quality according to the power level and/or the signal-to-noise ratio of the DMRS. This method may be used when the power saving information is monitored as part of a given control resource set (CORESET) or PDCCH channel. The decision on the quality may be based on an assumption of the aggregation level, PDCCH power levels and offset. These assumptions may be either configured by the network node or assumed based on UE measurement and/or past measurement/channel state information (CSI) report. Alternatively, the UE may determine the reliability according to the quality of a quasi-collocated reference signal (RS) or synchronization signal block (SSB) that where signalled by the network node.

In some implementations, in order to improve the beam management, some specific beam management rules may be applied. For example, in an event that the UE detects that the beams being monitored/activated and/or configured fall below a given threshold, even though the power saving information hasn't been received or it indicates sleep, then the UE may transmit a beam report to indicate the beam conditions. The threshold may be configured or determined based on the radio link failure configurations. Instead of a threshold, a beam report may be triggered when other beams have better quality. The beam report may be a periodic physical uplink control channel (PUCCH)-based report or UE triggered report based on the scheduling request initiation.

Illustrative Implementations

Figure 3:
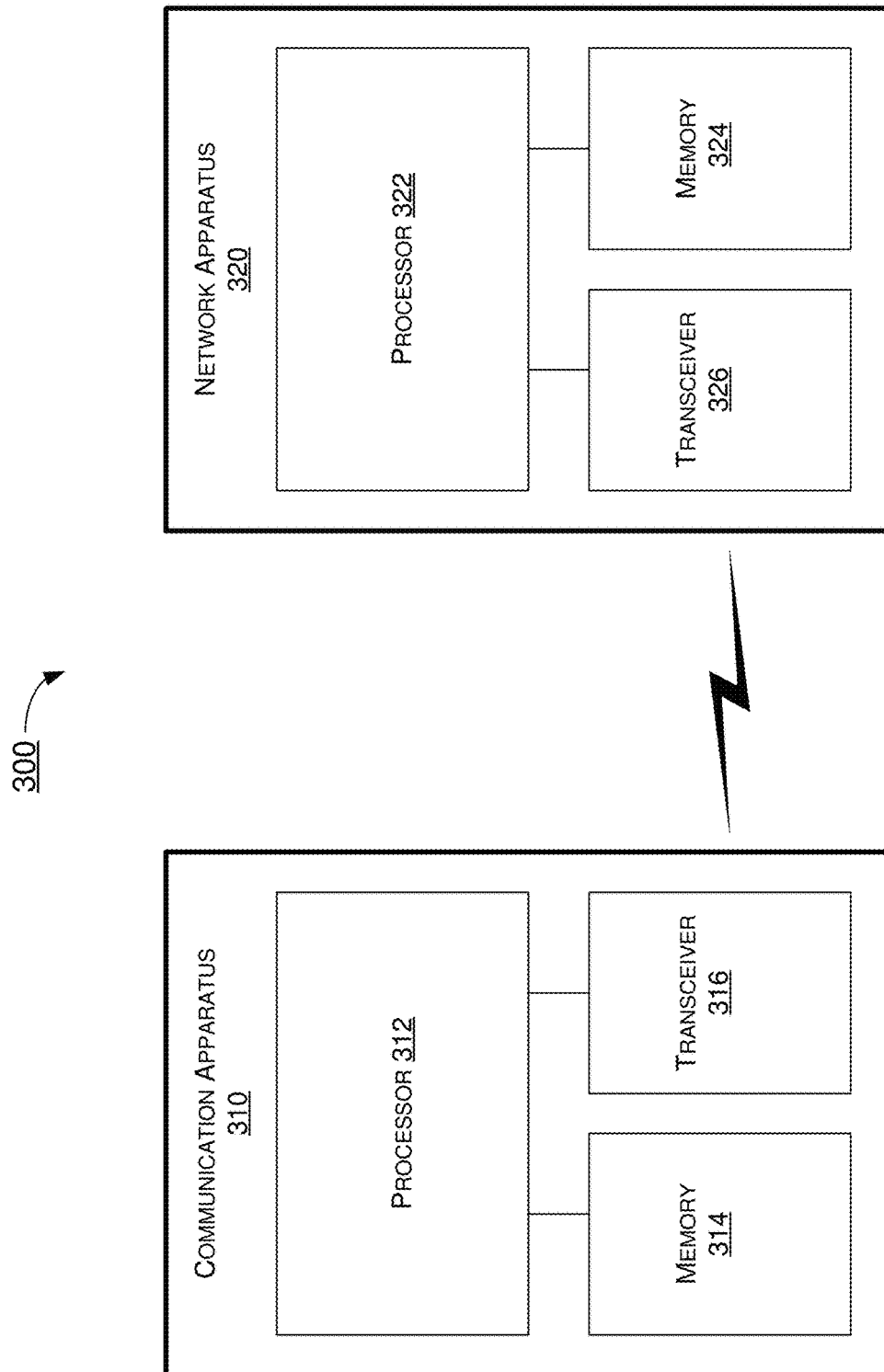
FIG. 3 is a block diagram of an example communication apparatus and an example network apparatus in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to indicating power saving information with respect to user equipment and network apparatus in wireless communications, including scenarios/mechanisms described above as well as processes 400 and 500 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT, NB-IoT or IIoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, when the power saving information is present, processor 312 may be configured to cancel the wake-up for the on duration or active time. Processor 312 may be configured to enter into a power saving mode. Processor 312 may monitor, via transceiver 316, a DCI format while in the power saving mode. Processor 312 may determine whether the DCI format is detected/received. In an event that the DCI format is detected/received, processor 312 may determine not to wake up from the power saving mode. After receiving the DCI format, processor 312 may keep staying in the power saving mode.

In some implementations, network apparatus 320 may use the DCI format (e.g., DCI format 2_6) to notify the power saving information to communication apparatus 310. The power saving information may comprise a WUI. The WUI may comprise one bit for indicating communication apparatus 310 to wake up or not to wake up. Alternatively, the DCI format may comprise a WUC indication. Network apparatus 320 may use the WUC indication to indicate communication apparatus 310 to cancel the wake-up for the on duration or active time. Accordingly, upon receiving the WUI indicating not to wake or the WUC indication, processor 312 may know that there is no data exchange expected and may stay in the power saving mode. Processor 312 may be configured to cancel the monitoring of the PDCCH in an event that the DCI format is detected/received.

In some implementations, when the power saving information is not present, processor 312 may be configured to wake up for the on duration or active time. Processor 312 may be configured to enter into a power saving mode. Processor 312 may monitor, via transceiver 316, a DCI format while in the power saving mode. Processor 312 may determine whether the DCI format is detected/received. In an event that the DCI format is not detected/received, processor 312 may determine to wake up from the power saving mode. Processor 312 may be configured to monitor, via transceiver 316, the PDCCH after waking up from the power saving mode.

In some implementations, network apparatus 320 may use the DCI format (e.g., DCI format 2_6) to carry the power saving information. The power saving information may comprise a WUI. The WUI may comprise one bit for indicating communication apparatus 310 to wake up or not to wake up. In absent of the DCI format or the power saving information, processor 312 may be not sure whether the DCI format is missed. Without an explicit indication indicating not to wake up, processor 312 may be configured to still wake up for monitoring any possible DL/UL activities. Thus, in an event that a WUI is missed, processor 312 still have chance to receive the scheduled DL/UL transmissions.

In some implementations, in an event that the DCI format is not detected, processor 312 may be configured to determine whether to wake up according to a higher layer signaling (e.g., RRC signaling). Network apparatus 320 may use the higher layer signaling to configure a parameter for indicating whether communication apparatus 310 wakes up or communication apparatus 310 does not wake up. Processor 312 may determine whether to wake up in an event that the DCI format is not detected according to the parameter in the higher layer signaling. For example, in an event that the parameter is configured as "not wake up", processor 312 may be configured not to wake up when the DCI format is not detected. In an event that the parameter is configured as "wake up", processor 312 may be configured to wake up when the DCI format is not detected.

In some implementations, network apparatus 320 may use the WUC indication/signal to indicate communication apparatus 310 not to wake up in an on duration (e.g., DRX-OnDuration) or cancel an on duration (e.g., DRX-OnDuration). Alternative, network apparatus 320 may indicate the WUC indication/signal as "Not monitor PDCCH in Drx-OnDuration" or cancel the DRX-OnDuration. Processor 312 may be configured to cancel the monitoring of the PDCCH after receiving the WUC indication/signal. Network apparatus 320 may include the WUC indication/signal in DCI or part of larger signalling message.

In some implementations, network apparatus 320 may transmit the power saving information/DCI format on a different beam from the beam used by communication apparatus 310 to monitor the other PDCCH/DCI messages. For example, network apparatus 320 may transmit the power saving information/DCI format on an omni-directional beam. Network apparatus 320 may use a group common DCI shared among a group of communication apparatus to carry the power saving information. Each communication apparatus in this case will have a dedicated number of bits used for the power saving information. Network apparatus 320 may transmit the power saving information/DCI format in a beam-sweeping mechanism. Network apparatus 320 may transmit the power saving information/DCI format over several beams to improve reliability.

In some implementations, in an event that processor 312 detects that the power saving information is not reliable enough, processor 312 may determine to ignore the outcome of the power saving information decoding and wake up normally to monitor the PDCCH. Alternatively, in an event that processor 312 hasn't received the power saving information, processor 312 may still wake-up to monitor the PDCCH. Alternatively, processor 312 may also wake up to send a signal to inform network apparatus 320 that the power saving information is not reliable.

In some implementations, processor 312 may be configured to determine the reliability of the power saving information. Processor 312 may determine the reliability according to the quality of the DMRS used for decoding the power saving information. For example, processor 312 may determine the quality according to the power level and/or the signal-to-noise ratio of the DMRS. This method may be used when the power saving information is monitored as part of a given CORESET or PDCCH channel. The decision on the quality may be based on an assumption of the aggregation level, PDCCH power levels and offset. These assumptions may be either configured by network apparatus 320 or assumed based on measurement and/or past measurement/CSI report at communication apparatus 310. Alternatively, processor 312 may determine the reliability according to the quality of a quasi-collocated RS or SSB that where signalled by network apparatus 320.

In some implementations, in an event that processor 312 detects that the beams being monitored/activated and/or configured fall below a given threshold, even though the power saving information hasn't been received or it indicates sleep, then processor 312 may transmit, via transceiver 316, a beam report to indicate the beam conditions. The threshold may be configured or determined based on the radio link failure configurations. Instead of a threshold, processor 312 may transmit a beam report when other beams have better quality.

Illustrative Processes

Figure 4:
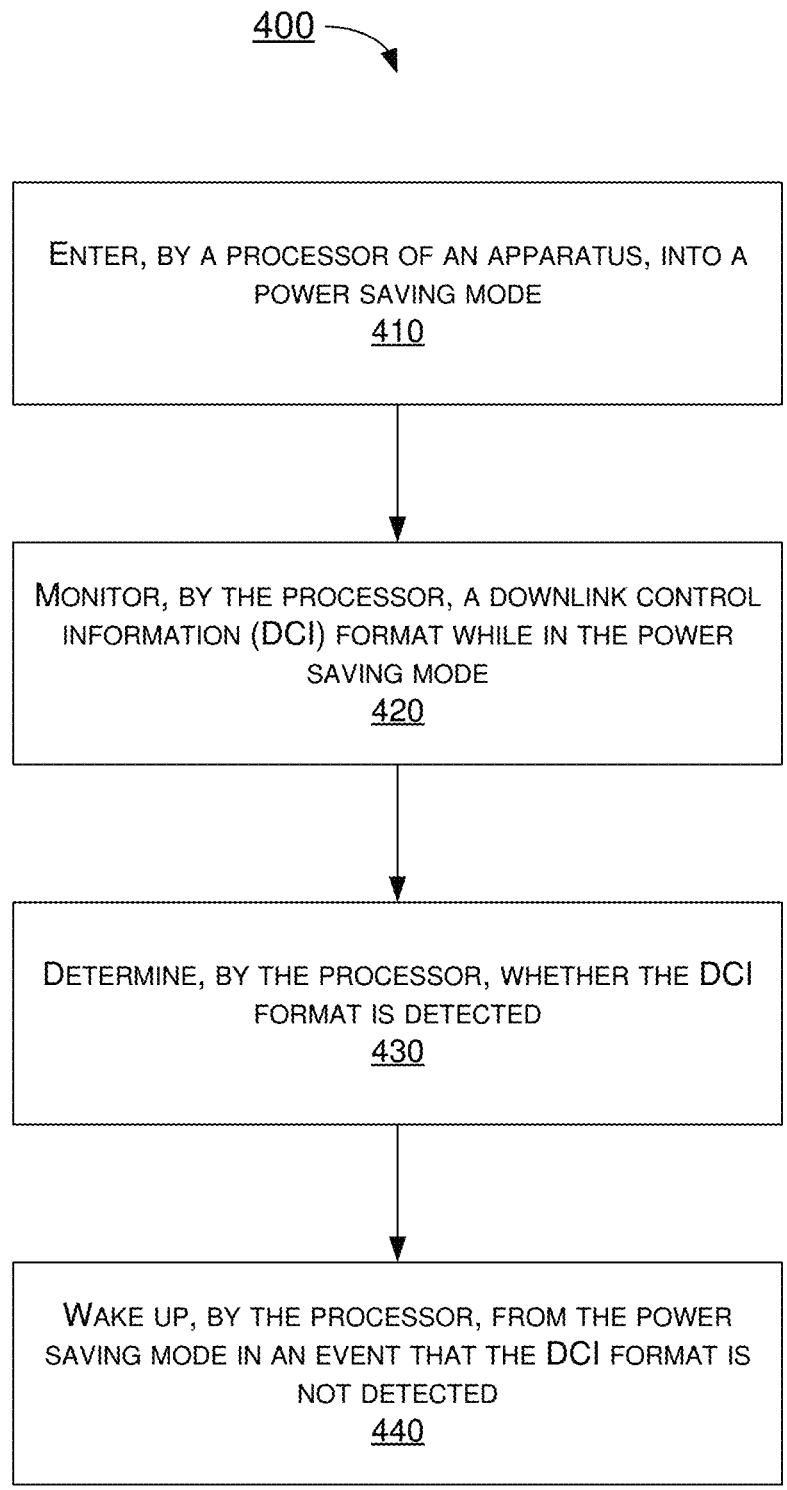
FIG. 4 is a flowchart of an example process in accordance with an implementation of the present disclosure.

FIG. 4 illustrates an example process 400 in accordance with an implementation of the present disclosure. Process 400 may be an example implementation of above scenarios/schemes, whether partially or completely, with respect to indicating power saving information with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 entering into a power saving mode. Process 400 may proceed from 410 to 420.

At 420, process 400 may involve processor 312 monitoring a DCI format while in the power saving mode. Process 400 may proceed from 420 to 430.

At 430, process 400 may involve processor 312 determining whether the DCI format is detected. Process 400 may proceed from 430 to 440.

At 440, process 400 may involve processor 312 waking up from the power saving mode in an event that the DCI format is not detected.

In some implementations, the DCI format may comprise power saving information. The power saving information may comprise a WUI.

In some implementations, process 400 may involve processor 312 monitoring a PDCCH after waking up from the power saving mode.

In some implementations, process 400 may involve processor 312 determining whether to wake up in an event that the DCI format is not detected according to a higher layer signaling.

Figure 5:
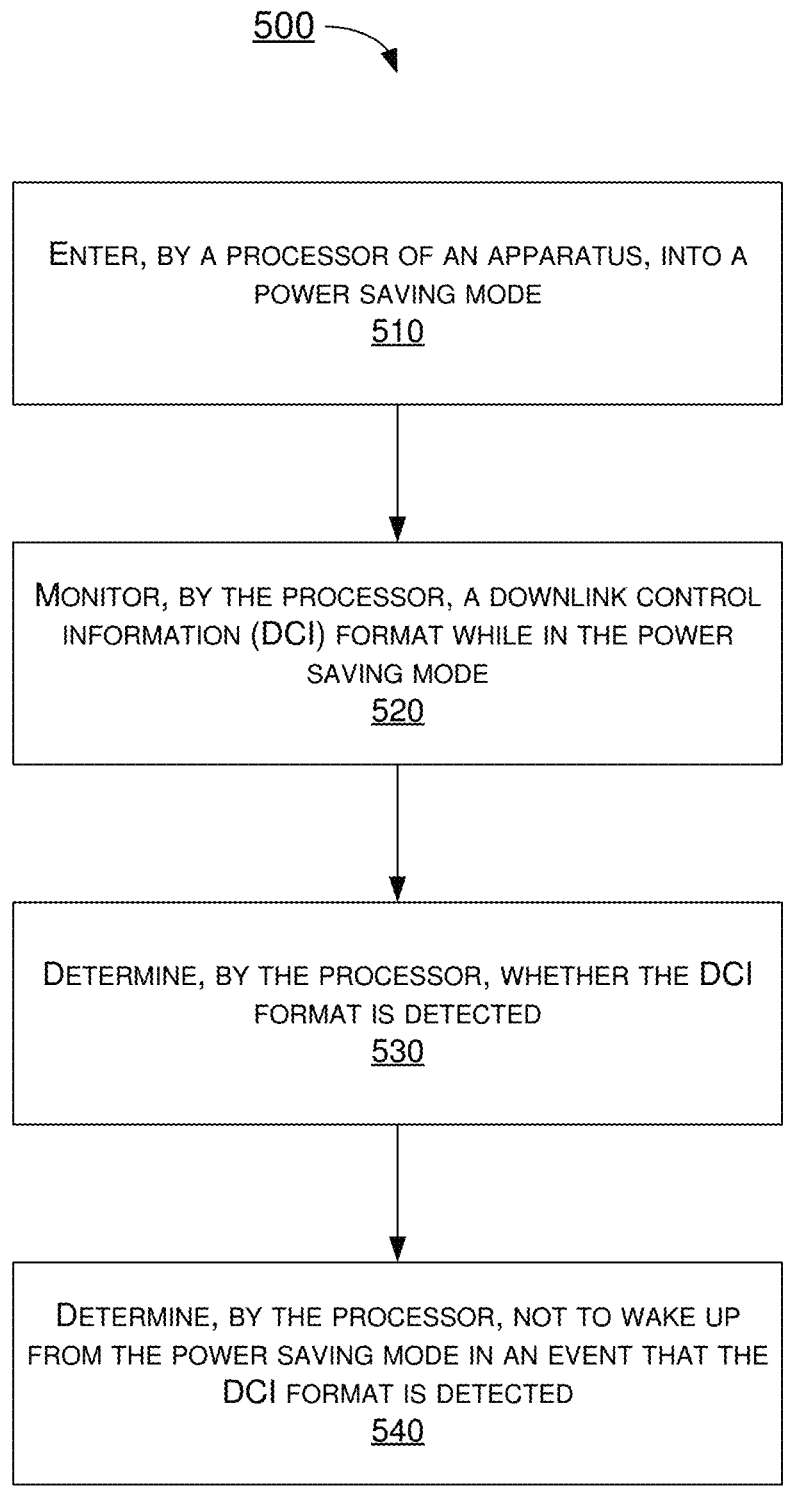
FIG. 5 is a flowchart of an example process in accordance with an implementation of the present disclosure.

FIG. 5 illustrates an example process 500 in accordance with an implementation of the present disclosure. Process 500 may be an example implementation of above scenarios/schemes, whether partially or completely, with respect to indicating power saving information with the present disclosure. Process 500 may represent an aspect of implementation of features of communication apparatus 310. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 310 or any suitable UE or machine type devices. Solely for illustrative purposes and without limitation, process 500 is described below in the context of communication apparatus 310. Process 500 may begin at block 510.

At 510, process 500 may involve processor 312 of apparatus 310 entering into a power saving mode. Process 500 may proceed from 510 to 520.

At 520, process 500 may involve processor 312 monitoring a DCI format while in the power saving mode. Process 500 may proceed from 520 to 530.

At 530, process 500 may involve processor 312 determining whether the DCI format is detected. Process 500 may proceed from 530 to 540.

At 540, process 500 may involve processor 312 determining not to wake up from the power saving mode in an event that the DCI format is detected.

In some implementations, the DCI format may comprise a WUI indicating not to wake or a WUC indication.

In some implementations, the DCI format may comprise a group common DCI.

In some implementations, the DCI format may be transmitted in a beam-sweeping mechanism.

In some implementations, process 500 may involve processor 312 cancelling monitoring of a PDCCH in an event that the DCI format is detected.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   entering, by a processor of an apparatus, into a power saving mode;
   monitoring, by the processor, a downlink control information (DCI) format comprising power saving information while in the power saving mode;
   determining, by the processor, a reliability of the power saving information;
   in an event that the power saving information is determined to be unreliable:
      ignoring, by the processor, the power saving information; and
      waking up, by the processor, the apparatus to monitor a physical downlink control channel (PDCCH);
   determining, by the processor, the DCI format is detected; and
   determining, by the processor, whether to stay in the power saving mode or wake up according to the detected DCI format,
   wherein the determining of the reliability of the power saving information comprises determining the reliability of the power saving information based on a channel decoder reliability metric.

2. The method of claim 1, further comprising:
   monitoring, by the processor, the PDCCH after waking up from the power saving mode.

3. The method of claim 1, further comprising:
   determining, by the processor, whether to wake up in an event that the DCI format is not detected according to a higher layer signaling.

4. A method, comprising:
   entering, by a processor of an apparatus, into a power saving mode;
   monitoring, by the processor, a downlink control information (DCI) format comprising power saving information while in the power saving mode;
   determining, by the processor, a reliability of the power saving information;
   in an event that the power saving information is determined to be unreliable:
      ignoring, by the processor, the power saving information; and
      waking up, by the processor, the apparatus to monitor a physical downlink control channel (PDCCH);
   determining, by the processor, the DCI format is detected; and
   staying in the power saving mode, by the processor, and not to wake up from the power saving mode according to an indication in the detected DCI format even at a time when the apparatus is scheduled to wake up,
   wherein the determining of the reliability of the power saving information comprises determining the reliability of the power saving information based on a channel decoder reliability metric.

5. The method of claim 4, wherein the DCI format is transmitted in a beam-sweeping mechanism.

6. The method of claim 4, further comprising:
   cancelling, by the processor, monitoring of the PDCCH in an event that the DCI format is detected.

7. An apparatus, comprising:
   a transceiver which, during operation, wirelessly communicates with a network node of a wireless network; and
   a processor communicatively coupled to the transceiver such that, during operation, the processor performs operations comprising:
      entering into a power saving mode;
      monitoring, via the transceiver, a downlink control information (DCI) format comprising power saving information while in the power saving mode;
      determining a reliability of the power saving information;
      in an event that the power saving information is determined to be unreliable:
         ignoring the power saving information; and
         waking up the apparatus to monitor a physical downlink control channel (PDCCH);
      determining the DCI format is detected; and
      determining whether to stay in the power saving mode or wake up according to the detected DCI format,
   wherein the determining of the reliability of the power saving information comprises determining the reliability of the power saving information based a channel decoder reliability metric.

8. The apparatus of claim 7, wherein, during operation, the processor further performs operations comprising:
   monitoring, via the transceiver, the PDCCH after waking up from the power saving mode.

9. The apparatus of claim 7, wherein, during operation, the processor further performs operations comprising:
   determining whether to wake up in an event that the DCI format is not detected according to a higher layer signaling.

10. An apparatus, comprising:
   a transceiver which, during operation, wirelessly communicates with a network node of a wireless network; and
   a processor communicatively coupled to the transceiver such that, during operation, the processor performs operations comprising:
      entering into a power saving mode;
      monitoring, via the transceiver, a downlink control information (DCI) format comprising power saving information while in the power saving mode;
      determining a reliability of the power saving information;
      in an event that the power saving information is determined to be unreliable:
         ignoring the power saving information; and
         waking up the apparatus to monitor a physical downlink control channel (PDCCH);
      determining the DCI format is detected; and
      staying in the power saving mode and not to wake up from the power saving mode according to an indication in the detected DCI format even at a time when the apparatus is scheduled to wake up,
   wherein the determining of the reliability of the power saving information comprises determining the reliability of the power saving information based on a channel decoder reliability metric.

11. The apparatus of claim 10, wherein the DCI format is transmitted in a beam-sweeping mechanism.

12. The apparatus of claim 10, wherein, during operation, the processor further performs operations comprising:
   cancelling monitoring of the PDCCH in an event that the DCI format is detected.

* * * * *